United States Patent
Murashige et al.

(10) Patent No.: US 10,221,090 B2
(45) Date of Patent: *Mar. 5, 2019

(54) TRANSPARENT SUBSTRATE

(75) Inventors: Takeshi Murashige, Ibaraki (JP);
Daisuke Hattori, Ibaraki (JP);
Yoshimasa Sakata, Ibaraki (JP);
Takashi Yamaoka, Ibaraki (JP);
Tatsuki Nagatsuka, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 229 days.

This patent is subject to a terminal disclaimer.

(21) Appl. No.: 13/501,056

(22) PCT Filed: Aug. 3, 2010

(86) PCT No.: PCT/JP2010/063097
§ 371 (c)(1),
(2), (4) Date: Apr. 9, 2012

(87) PCT Pub. No.: WO2011/048861
PCT Pub. Date: Apr. 28, 2011

(65) Prior Publication Data
US 2012/0196103 A1    Aug. 2, 2012

(30) Foreign Application Priority Data
Oct. 23, 2009 (JP) ................ 2009-244142

(51) Int. Cl.
*B32B 17/06* (2006.01)
*B32B 17/10* (2006.01)
(Continued)

(52) U.S. Cl.
CPC ............ *C03C 17/32* (2013.01); *B32B 17/064* (2013.01); *C03C 17/3405* (2013.01);
(Continued)

(58) Field of Classification Search
CPC ............... G02F 1/133305; B32B 17/10; B32B 17/10009; B32B 17/10165; B32B 17/1055
(Continued)

(56) References Cited

U.S. PATENT DOCUMENTS

| 3,622,331 A | 11/1971 | Thomas |
| 4,631,335 A | 12/1986 | Scola et al. |

(Continued)

FOREIGN PATENT DOCUMENTS

| CN | 1341083 A | 3/2002 |
| CN | 1367766 A | 9/2002 |

(Continued)

OTHER PUBLICATIONS

International Search Report of PCT/JP2010/063097, dated Sep. 7, 2010.

(Continued)

*Primary Examiner* — Joanna Pleszczynska
(74) *Attorney, Agent, or Firm* — Westerman, Hattori, Daniels & Adrian, LLP (57) ABSTRACT

The present invention provides a transparent substrate that significantly prevents the progress of a crack in a thin-plate glass and the rupture of the glass, and is excellent in bending property and flexibility. A transparent substrate according to an embodiment of the present invention includes: a thin-plate glass having a thickness of 10 μm to 100 μm; and a resin layer on at least one side of the thin-plate glass, wherein a shrinkage stress of the resin layer on the thin-plate glass is 5 MPa or more.

15 Claims, 2 Drawing Sheets

(51) Int. Cl.
*G02F 1/1333* (2006.01)
*B32B 7/12* (2006.01)
*C03C 17/32* (2006.01)
*C03C 17/34* (2006.01)

(52) U.S. Cl.
CPC ... *B32B 2307/412* (2013.01); *B32B 2307/536* (2013.01); *B32B 2307/542* (2013.01); *B32B 2307/544* (2013.01); *B32B 2307/546* (2013.01); *C03C 2218/365* (2013.01); *G02F 2001/133302* (2013.01); *Y10T 156/10* (2015.01); *Y10T 428/2495* (2015.01); *Y10T 428/266* (2015.01)

(58) Field of Classification Search
USPC ........ 428/213, 220, 337, 426, 430, 431, 441
See application file for complete search history.

(56) References Cited

U.S. PATENT DOCUMENTS

| | | | |
|---|---|---|---|
| 4,839,219 A | 6/1989 | Uekita et al. | |
| 4,943,471 A | 7/1990 | Uekita et al. | |
| 5,071,733 A | 12/1991 | Uekita et al. | |
| 5,343,260 A | 8/1994 | Henry et al. | |
| 5,569,537 A | 10/1996 | Miyasaka et al. | |
| 6,103,854 A | 8/2000 | Arakawa et al. | |
| 6,281,525 B1 | 8/2001 | Krijn et al. | |
| 6,287,674 B1* | 9/2001 | Verlinden et al. | 428/210 |
| 6,313,525 B1 | 11/2001 | Sasano | |
| 6,492,028 B2 | 12/2002 | Kotera et al. | |
| 6,500,914 B1 | 12/2002 | Brack et al. | |
| 6,592,969 B1 | 7/2003 | Burroughes et al. | |
| 6,689,626 B2 | 2/2004 | Krijn et al. | |
| 6,815,070 B1 | 11/2004 | Burkle et al. | |
| 6,853,123 B1 | 2/2005 | Nattermann et al. | |
| 6,994,906 B2 | 2/2006 | Burroughes et al. | |
| 7,359,021 B2 | 4/2008 | Ota et al. | |
| 7,391,048 B2 | 6/2008 | Gotoh et al. | |
| 7,514,866 B2 | 4/2009 | Burroughes et al. | |
| 7,638,797 B2 | 12/2009 | Gotoh et al. | |
| 7,812,261 B2 | 10/2010 | Yamashita et al. | |
| 7,812,530 B2 | 10/2010 | Handa et al. | |
| 8,138,580 B2 | 3/2012 | Konishi et al. | |
| 8,241,735 B2 | 8/2012 | Murashige et al. | |
| 2001/0000789 A1 | 5/2001 | Kotera et al. | |
| 2001/0050372 A1 | 12/2001 | Krijn et al. | |
| 2002/0018883 A1 | 2/2002 | Okazaki et al. | |
| 2002/0024131 A1 | 2/2002 | Sasano | |
| 2003/0124341 A1 | 7/2003 | Burroughes et al. | |
| 2003/0178082 A1* | 9/2003 | Yamaguchi et al. | 138/129 |
| 2004/0071960 A1 | 4/2004 | Weber et al. | |
| 2004/0141141 A1 | 7/2004 | Ota et al. | |
| 2005/0051791 A1 | 3/2005 | Gotoh et al. | |
| 2005/0070643 A1 | 3/2005 | Merfeld et al. | |
| 2005/0236985 A1 | 10/2005 | Handa et al. | |
| 2006/0134394 A1 | 6/2006 | Burroughes et al. | |
| 2007/0102361 A1* | 5/2007 | Kiefer et al. | 210/650 |
| 2007/0122631 A1 | 5/2007 | Higuchi et al. | |
| 2007/0190846 A1 | 8/2007 | Yamashita et al. | |
| 2008/0160871 A1 | 7/2008 | Ota et al. | |
| 2008/0237537 A1 | 10/2008 | Huang et al. | |
| 2008/0265245 A1 | 10/2008 | Gotoh et al. | |
| 2008/0280073 A1 | 11/2008 | Yamamoto | |
| 2010/0062234 A1 | 3/2010 | Murashige et al. | |
| 2010/0143681 A1 | 6/2010 | Yano et al. | |
| 2010/0193961 A1 | 8/2010 | Konishi et al. | |
| 2010/0276066 A1 | 11/2010 | Kondo | |
| 2011/0114160 A1 | 5/2011 | Murashige et al. | |
| 2011/0244225 A1 | 10/2011 | Hattori et al. | |

FOREIGN PATENT DOCUMENTS

| | | |
|---|---|---|
| CN | 1878735 A | 12/2006 |
| CN | 1882666 A | 12/2006 |
| CN | 101356558 A | 1/2009 |
| EP | 0319008 A2 | 6/1989 |
| EP | 0556646 A1 | 8/1993 |
| EP | 0636471 A1 | 2/1995 |
| EP | 0982365 A1 | 3/2000 |
| EP | 1013413 A1 | 6/2000 |
| EP | 2 273 476 A1 | 1/2011 |
| EP | 2 363 383 A1 | 9/2011 |
| GB | 1184042 A | 3/1970 |
| GB | 2208231 A | 3/1989 |
| JP | 63-126578 A | 5/1988 |
| JP | 04-212931 A | 8/1992 |
| JP | 04-235527 A | 8/1992 |
| JP | 04-248890 A | 9/1992 |
| JP | 06-145636 A | 5/1994 |
| JP | 06-340029 A | 12/1994 |
| JP | 06-340861 A | 12/1994 |
| JP | 7-205374 A | 8/1995 |
| JP | 11-329715 A | 11/1999 |
| JP | 2000-062074 A | 2/2000 |
| JP | 2000-105312 A | 4/2000 |
| JP | 2001-113631 A | 4/2001 |
| JP | 2001-162721 A | 6/2001 |
| JP | 2002-521234 A | 7/2002 |
| JP | 2002-297054 A | 10/2002 |
| JP | 2002-534305 A | 10/2002 |
| JP | 2002-542971 A | 12/2002 |
| JP | 2003-053259 A | 2/2003 |
| JP | 2003-212600 A | 7/2003 |
| JP | 2003-531088 A | 10/2003 |
| JP | 2003-337549 A | 11/2003 |
| JP | 2004-050565 A | 2/2004 |
| JP | 2004-079432 A | 3/2004 |
| JP | 2004-91682 A | 3/2004 |
| JP | 2004-205976 A | 7/2004 |
| JP | 2004-346101 A | 12/2004 |
| JP | 2004-352747 A | 12/2004 |
| JP | 2005-014563 A | 1/2005 |
| JP | 2005-48140 A | 2/2005 |
| JP | 2005-085710 A | 3/2005 |
| JP | 2005-138389 A | 6/2005 |
| JP | 2005-144872 A | 6/2005 |
| JP | 2005-251845 A | 9/2005 |
| JP | 2005-297498 A | 10/2005 |
| JP | 2005-322490 A | 11/2005 |
| JP | 2005-324992 A | 11/2005 |
| JP | 2006-221892 A | 8/2006 |
| JP | 2006-276105 A | 10/2006 |
| JP | 2006-282741 A | 10/2006 |
| JP | 2006-323373 A | 11/2006 |
| JP | 2007-010834 A | 1/2007 |
| JP | 2007-106742 A | 4/2007 |
| JP | 2007-203473 A | 8/2007 |
| JP | 2007-207655 A | 8/2007 |
| JP | 2008-107510 A | 5/2008 |
| JP | 2008-242154 A | 10/2008 |
| JP | 2009-094493 A | 4/2009 |
| JP | 2010-125719 A | 6/2010 |
| JP | 2010-221441 A | 10/2010 |
| JP | 2010-280092 A | 12/2010 |
| TW | 200833507 A | 8/2008 |
| WO | 98/030649 A1 | 7/1998 |
| WO | 2005-047200 A1 | 5/2005 |
| WO | 2005/069707 A1 | 7/2005 |
| WO | 2005/118731 A2 | 12/2005 |
| WO | 2007/114159 A1 | 10/2007 |
| WO | 2008/050547 A1 | 5/2008 |
| WO | 2009/093505 A1 | 7/2009 |
| WO | 2009/131073 A1 | 10/2009 |

OTHER PUBLICATIONS

Japanese Office Action dated Sep. 4, 2013 issued in corresponding Japanese Patent Application No. 2009-102804, w/English translation.

Extended European Search Report dated Jan. 8, 2014, issued in European Application No. 10824713.1.

(56) References Cited

OTHER PUBLICATIONS

Korean Notification of Argument Submission dated May 21, 2013, issued in Korean Patent Application 10-2010-7023522, w/ English translation.
Parvin, M. et al., "Ductile-brittle fracture transitions in polycarbonate", International Journal of Fracture, vol. 11, No. 6, Dec. 1975, p. 963-972; cited in Korean Office Action dated May 21, 2013.
Choi, S. et al., "Effect of Solvent Extraction on the Low Molecular Weight and Volatile Organic Compounds of Polycarbonate", Appl. Chem. Eng., vol. 21, No. 5, Oct. 2010, p. 532-536, w/ English translation; cited in Korean Office Action dated May 21, 2013.
U.S. Office Action dated Dec. 11, 2013, issued in U.S. Appl. No. 12/988,716.
Chinese Office Action dated Apr. 23, 2013, issued in Chinese Patent Application No. 200980144358.9, w/ English translation, 24 pp.
Chinese Office Action dated Sep. 1, 2011, issued in corresponding Chinese Patent Application No. 200780001300 (w/ English translation).
Chinese Office Action dated Jul. 30, 2012, issued in corresponding Chinese patent application No. 200980113979.0 and with English translation.
Office Action dated Mar. 13, 2013, issued in U.S. Appl. No. 12/988,716.
Cheric, Transition Temperature, retrieved Jan. 3, 2012, www.cheric.org/ippage/d/ipdata/2001/01*file/d200101-601.pdf, pp. 1-21.
Office Action dated Jan. 7, 2013, issued in corresponding U.S. Appl. No. 13/128,086.
Japanese Office Action dated Nov. 28, 2012, issued in corresponding Japanese patent application No. 2009-264754, w/ English translation.
Japanese Office Action dated Dec. 26, 2012, issued in corresponding Japanese patent application No. 2009-102803, w/ English translation.
Japanese Office Action dated Mar. 13, 2013, issued in corresponding Japanese Patent Application No. 2009-101043, with English translation (8 pages).
Non-Final Rejection Office Action dated Jan. 20, 2012, issued in U.S. Appl. No. 12/091,781.
Non-Final Rejection Office Action dated Jun. 21, 2011, issued in U.S. Appl. No. 12/091,781.
Final Rejection Office Action dated Oct. 7, 2011, issued in U.S. Appl. No. 12/091,781.
Final Office Action dated Jul. 11, 2013, issued in U.S. Appl. No. 13/128,086.
Hawinkels, Fatigue Crack Propagation in Polycarbonate, Eindhoven University of Technology, Aug. 2011, pp. 1-36.
Engineering Toolbox, Elastic Properties and Young Modulus for some Materials, retrieved Jan. 4, 2013, pp. 1-10.
Notice of Allowance dated May 25, 2012, issued in U.S. Appl. No. 12/091,781.
Taiwanese Office Action dated Aug. 8, 2013, issued in corresponding Taiwanese Patent Application No. 099135110 with English translation (7 pages).
Office Action dated Apr. 23, 2014, issued in corresponding Japanese Patent Application No. 2013-154242, w/ English Translation (8 pages).
Taiwanese Office Action dated Jan. 13, 2014, issued in related Taiwanese patent application No. 098137780, w/English translation (7 pages).
Humer, K. et al., "Tensile, fracture and thermal properties of polyarylates at room and cryogenic temperatures", Cryogenics, vol. 33, No. 7, 1993, pp. 686-691, Cited in Extended European Search Report dated Mar. 21, 2014 (6 pages).
Extended European Search Report dated Mar. 21, 2014, issued in European application No. 09734244.8 (10 pages).
U.S. Office Action dated Apr. 7, 2015, issued in co-pending U.S. Appl. No. 13/128,086 (92 pages).
Non-Final Office Action dated Jan. 4, 2016, issued in U.S. Appl. No. 12/988,716 (28 pages).
Extended European Search Report dated Aug. 17, 2015, issued in counterpart European Patent Application No. 15157126.2 (6 pages).
Final Office Action dated Jul. 15, 2015, issued in U.S. Appl. No. 12/988,716 (30 pages).
Final Office Action dated Oct. 6, 2015, issued in U.S Appl. No. 13/128,086 (57 pages).
Office Action dated Nov. 16, 2017, issued in counterpart European Aplication No. 10824713.1. (4 pages).
Final Office Action dated Nov. 29, 2017, issued in U.S. Appl. No. 12/988,716 (19 pages).
Rosenstiel et al., "Contemporary Fixed Prosthodontics", Elsevier Health Sciences, 2006, Fourth Edition, p. 800 (cited in U.S. Office Action dated Mar. 13, 2013, issued in U.S. Appl. No. 12/988,716.
Non-Final Office Action dated Jun. 18, 2018, issued in U.S. Appl. No. 15/940,070 (43 pages).
Non-Final Office Action dated Jul. 6, 2018, issued in U.S. Appl. No. 12/988,716 (24 pages).
Office Action dated Jul. 10, 2017, issued in Chinese Application No. 201510523237.2, with English translation (18 pages).

\* cited by examiner

TRANSPARENT SUBSTRATE

TECHNICAL FIELD

The present invention relates to a transparent substrate. More specifically, the present invention relates to a transparent substrate that significantly prevents the progress of a crack in a thin-plate glass and the rupture of the glass, and is excellent in bending property and flexibility.

BACKGROUND ART

In recent years, display apparatus such as flat panel displays (FPDs: liquid crystal display apparatus, organic EL display apparatus, and the like) and a solar cell have been made more and more flexible from the viewpoints of, for example, easy conveyance, storing easiness, and design property, and the weight reduction and thinning of the transparent substrate to be used in the display apparatus and the solar cell, and in addition, an improvement in bending property thereof have been requested. Glass substrates have been conventionally used in many cases as transparent substrates for use in the display apparatus and the solar cells. The glass substrate is excellent in transparency, solvent resistance, gas barrier property, heat resistance, and dimensional stability. However, when one attempts to achieve the weight reduction and thinning of a glass material, which forms such glass substrate, the following problem arises. That is, though the glass substrate shows some degree of bending property, the brittleness of glass against a crack or the like is conspicuously exhibited, and hence the glass substrate becomes difficult to handle.

In view of the foregoing, an attempt has been made to use a resin film excellent in stiffness, and having a lighter weight and more excellent bending property than those of glass in a substrate for a display device. However, a resin for constructing the resin film has a higher coefficient of thermal expansion than that of an inorganic material such as the glass, and hence the substrate for a display device obtained by using the resin film involves the following problems. The distortion of the substrate occurs, or a crack occurs in an electrode at the time of the formation of a circuit to cause an increase in resistance value or disconnection. In addition, when a resin having an aromatic ring and/or a heterocycle introduced into its main chain for improving its heat resistance is used, the resin film undergoes coloring and hence a display device having sufficient display performance cannot be obtained. In order that such problems concerning the thermal expansion and the coloring may be resolved, the following has been investigated. A substrate for a display device is obtained by using a resin such as a polycarbonate, a polyarylate, or a polyether sulfone. However, such resin cannot provide a substrate for a display device having sufficient dimensional stability because its coefficient of linear expansion is about ten times as high as that of the glass. Further, the resin film does not have sufficient gas barrier property. Accordingly, when the resin film is used in a substrate for a display device, a gas barrier layer needs to be formed on its surface. As a result, a problem such as an increase in the number of production steps, a reduction in yield, or an increase in cost arises.

To solve those problems, such a substrate that a resin layer is formed on a glass surface has been disclosed (see, for example, Patent Documents 1 and 2). However, it has still been unable to obtain a transparent substrate showing sufficient bending property even with such technology because the technology is insufficient in terms of the optimization of a resin material for reinforcing the glass.

CITATION LIST

Patent Documents

[PTL 1] JP 11-329715 A
[PTL 2] JP 2008-107510 A

SUMMARY OF INVENTION

Problems to be Solved by the Invention

The present invention has been made to solve the above-mentioned conventional problems, and an object of the present invention is to provide a transparent substrate that significantly prevents the progress of a crack in a thin-plate glass and the rupture of the glass, and is excellent in bending property and flexibility.

Means for Solving the Problems

A transparent substrate according to an embodiment of the present invention includes: a thin-plate glass having a thickness of 10 μm to 100 μm; and a resin layer on at least one side of the thin-plate glass, wherein a shrinkage stress of the resin layer on the thin-plate glass is 5 MPa or more.

In a preferred embodiment, a ratio ($d_2/d_1$) between the thickness ($d_1$) of the thin-plate glass and a total thickness ($d_2$) of the resin layer is 0.3 to 4.

In a preferred embodiment, the resin layer has a modulus of elasticity at 25° C. of 1.0 GPa or more.

In a preferred embodiment, the resin layer has a fracture toughness value at 25° C. of 1.5 MPa·m$^{1/2}$ or more.

In a preferred embodiment, the resin layer contains a resin, and the resin has a glass transition temperature of 150° C. to 350° C.

In a preferred embodiment, the resin layer is obtained by applying a solution of a resin to a surface on at least one side of the thin-plate glass to form an applied layer and drying the applied layer.

In a preferred embodiment, the thin-plate glass and the resin layer are placed through an adhesion layer.

In a preferred embodiment, the resin layer is obtained by attaching a resin film to a surface on at least one side of the thin-plate glass through the adhesion layer to form a laminate and subjecting the laminate to a heating treatment.

In a preferred embodiment, the transparent substrate further includes a hard coat layer having a pencil hardness of H or more on a side of the resin layer opposite to the thin-plate glass.

In a preferred embodiment, the transparent substrate is used as a substrate for a display device.

In a preferred embodiment, the transparent substrate is used as a substrate for a solar cell.

In a preferred embodiment, the transparent substrate is used as a substrate for a lighting device.

According to another aspect of the present invention, a display device is provided. The display device is produced using the above-described transparent substrate.

According to another aspect of the present invention, a solar cell is provided. The solar cell is produced using the above-described transparent substrate.

According to another aspect of the present invention, a lighting device is provided. The lighting device is produced using the above-described transparent substrate.

Advantageous Effects of Invention

According to the present invention, there can be provided the following transparent substrate. The transparent substrate includes a resin layer having a specific shrinkage stress on at least one side of a thin-plate glass to reinforce the thin-plate glass, thereby significantly preventing the progress of a crack in the thin-plate glass and the rupture of the glass. In addition, the transparent substrate is excellent in bending property and flexibility.

DESCRIPTION OF EMBODIMENTS

A. Entire Construction of Transparent Substrate

Figure 1A:
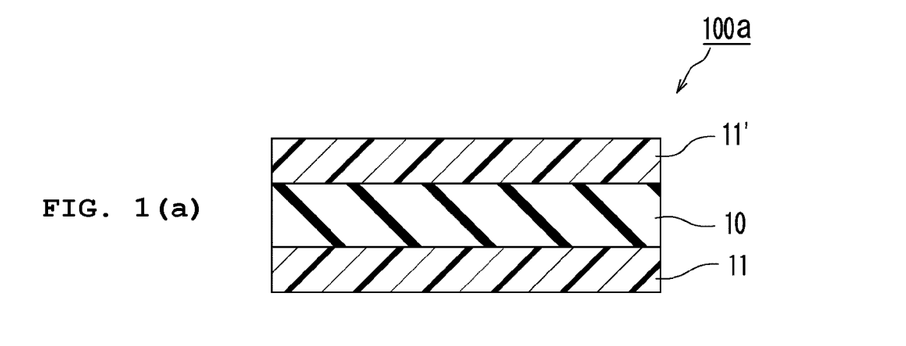
FIG. 1(a) is a schematic sectional view of a transparent substrate according to a preferred embodiment of the present invention and FIG. 1(b) is a schematic sectional view of a transparent substrate according to another preferred embodiment of the present invention.
Figure 1B:
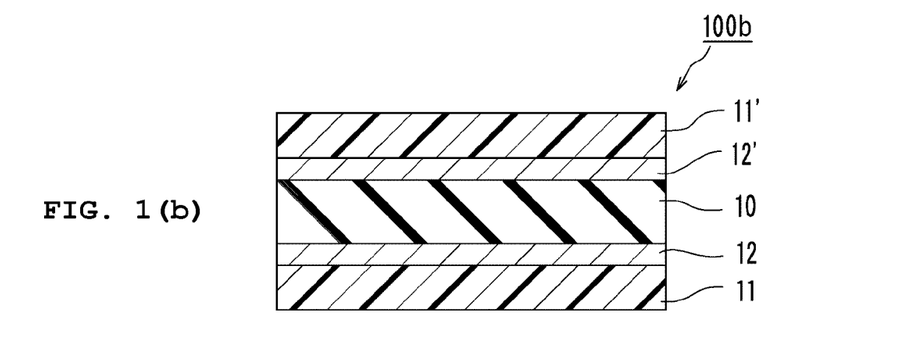
Figure 2A:
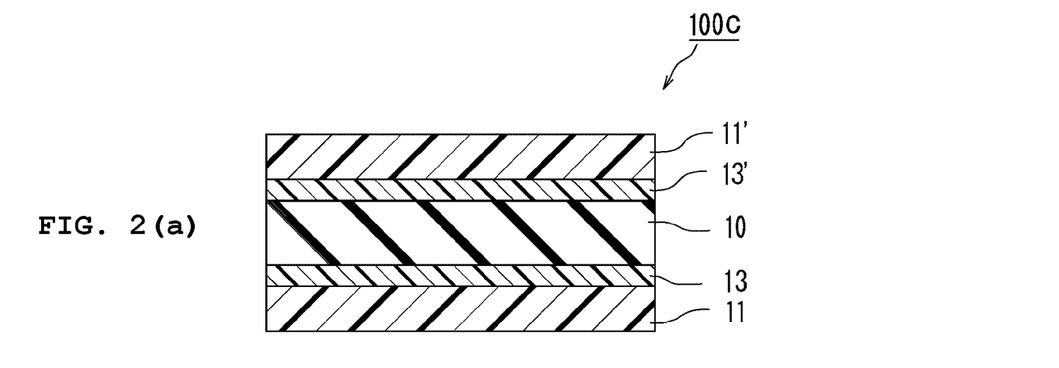
FIG. 2(a) is a schematic sectional view of a transparent substrate according to still another embodiment of the present invention and FIG. 2(b) is a schematic sectional view of a transparent substrate according to still another preferred embodiment of the present invention.
Figure 2B:
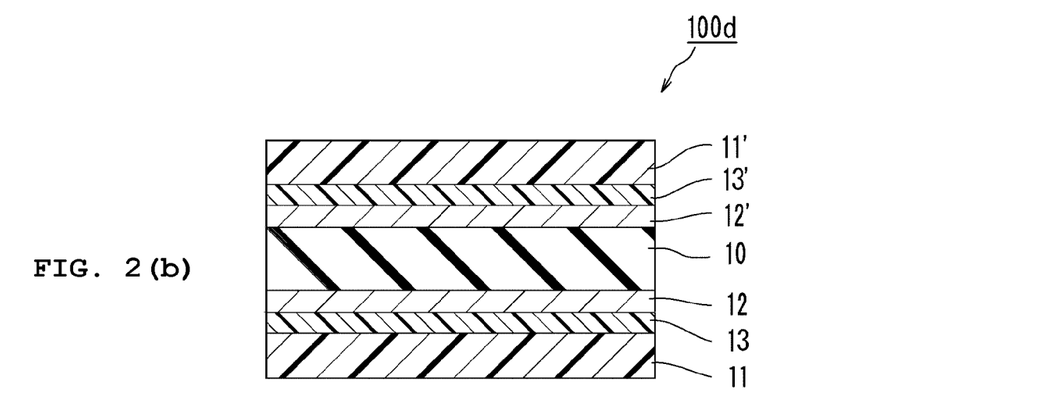

FIG. 1(a) is a schematic sectional view of a transparent substrate according to a preferred embodiment of the present invention. A transparent substrate 100a in the figure includes a thin-plate glass 10 and a resin layer 11, 11' placed on at least one side of the thin-plate glass 10 (preferably on each of both sides like the illustrated example). FIG. 1(b) is a schematic sectional view of a transparent substrate according to another preferred embodiment of the present invention. A transparent substrate 100b in the figure further includes a coupling agent layer 12, 12' between the thin-plate glass 10 and the resin layer 11, 11'. FIG. 2(a) is a schematic sectional view of a transparent substrate according to still another preferred embodiment of the present invention. A transparent substrate 100c in the figure further includes an adhesion layer 13, 13' between the thin-plate glass 10 and the resin layer 11, 11'. FIG. 2(b) is a schematic sectional view of a transparent substrate according to still another preferred embodiment of the present invention. A transparent substrate 100d in the figure further includes the coupling agent layer 12, 12' and the adhesion layer 13, 13' between the thin-plate glass 10 and the resin layer. Although not illustrated, any one of the transparent substrates can include any appropriate other layer on the side of the resin layer opposite to the thin-plate glass (i.e. outermost layer of the transparent substrate) as required. Examples of the other layer include a hard coat layer and a transparent conductive layer.

In the transparent substrate of the present invention, the thin-plate glass and the resin layer may be placed through the coupling agent layer (thin-plate glass/coupling agent layer/resin layer) as illustrated in FIG. 1(b), or the thin-plate glass and the resin layer may be placed through the adhesion layer (thin-plate glass/adhesion layer/resin layer) as illustrated in FIG. 2(a). In addition, the transparent substrate of the present invention may be as described below. That is, as illustrated in FIG. 2(b), the transparent substrate has the coupling agent layer and the adhesion layer, and the thin-plate glass, the coupling agent layer, the adhesion layer, and the resin layer are placed in the stated order. It is preferred that the coupling agent layer be directly formed on the thin-plate glass. It is more preferred that the thin-plate glass and the resin layer be placed only through the coupling agent layer (thin-plate glass/coupling agent layer/resin layer). With such construction, the thin-plate glass and the resin layer can be caused to adhere to each other strongly, and hence a transparent substrate which is excellent in dimensional stability and in which a crack hardly progresses can be obtained.

It is preferred that the coupling agent layer be chemically bonded (typically, covalently bonded) to the thin-plate glass. As a result, a transparent substrate excellent in adhesiveness between the thin-plate glass and the coupling agent layer can be obtained.

It is preferred that the resin layer or the adhesion layer be bonded to the coupling agent layer with a chemical bond (typically, a covalent bond), or interact with the coupling agent layer. As a result, a transparent substrate excellent in adhesiveness between the coupling agent layer and the resin layer or the adhesion layer can be obtained.

The transparent substrate has a total thickness of preferably 150 μm or less, more preferably 140 μm or less, particularly preferably 80 μm to 130 μm. According to the present invention, the thickness of the thin-plate glass can be made much smaller than that of a conventional glass substrate by virtue of the presence of the resin layer as described above. That is, the resin layer can contribute to improvements in impact resistance and toughness even when the resin layer is thin. Accordingly, the transparent substrate of the present invention having the resin layer has a light weight, a small thickness, excellent impact resistance, and excellent bending property.

A ratio ($d_2/d_1$) between the thickness ($d_1$) of the thin-plate glass and the total thickness ($d_2$) of the resin layer is preferably 0.3 to 4, more preferably 0.7 to 3, particularly preferably 1 to 2. When the ratio ($d_2/d_1$) between the thickness ($d_1$) of the thin-plate glass and the total thickness ($d_2$) of the resin layer is less than 0.3, the shrinkage stress of the resin layer reduces and hence there is a possibility that the thin-plate glass cannot be sufficiently reinforced. When the ratio is more than 4, a stress to occur in the thin-plate glass becomes so large that the resin layer may be apt to peel off the thin-plate glass. It should be noted that when the transparent substrate of the present invention includes resin layers on both sides of the thin-plate glass, the term "total thickness of the resin layers" as used herein refers to the sum of the thicknesses of the respective resin layers.

The transparent substrate has a rupture diameter, which is determined when the transparent substrate is cracked and bent, of preferably 50 mm or less, more preferably 35 mm or less, particularly preferably 30 mm or less, most preferably 20 mm to 30 mm. The transparent substrate of the present invention includes a specific resin layer and thus exhibits excellent flexibility (for example, a rupture diameter in the above-mentioned range).

The light transmittance of the transparent substrate at a wavelength of 550 nm is preferably 80% or more, more preferably 85% or more. The reduction ratio of light transmittance of the transparent substrate after a heating treatment at 180° C. for 2 hours is preferably within 5%. This is because, with such reduction ratio, the practically allowable light transmittance can be kept, even if a heating treatment required in a production process of display devices and solar cells is conducted.

A surface roughness Ra (substantially, a surface roughness Ra of the resin layer or the other layer) of the transparent substrate is preferably 50 nm or less, more preferably 30 nm or less, particularly preferably 10 nm or less. The waviness of the transparent substrate is preferably 0.5 μm or less, more preferably 0.1 μm or less. The transparent substrate with such characteristics is excellent in quality. It should be noted that such characteristics can be realized, for example, by a production method described later.

The transparent substrate has a coefficient of linear expansion of preferably 15 ppm/° C. or less, more preferably 10 ppm/° C. or less, particularly preferably 1 ppm/° C. to 10 ppm/° C. The transparent substrate shows excellent dimensional stability (e.g., a coefficient of linear expansion within such a range as described above) because the transparent substrate includes the thin-plate glass. More specifically, the thin-plate glass itself is stiff, and fluctuations in dimensions of the resin layer can be suppressed because the resin layer is restrained by the thin-plate glass. As a result, the entirety of the transparent substrate shows excellent dimensional stability.

B. Inorganic Glass

As the inorganic glass used in the transparent substrate of the present invention, any appropriate glass can be adopted as long as the glass is in a plate shape. Examples of the inorganic glass include soda-lime glass, borate glass, aluminosilicate glass, and quartz glass according to the classification based on a composition. Further, according to the classification based on an alkali component, no-alkali glass and low alkali glass are exemplified. The content of an alkali metal component (e.g., $Na_2O$, $K_2O$, $Li_2O$) of the inorganic glass is preferably 15 wt % or less, more preferably 10 wt % or less.

The thickness of the inorganic glass is preferably 10 μm to 100 μm, more preferably 20 μm to 70 μm, particularly preferably 30 μm to 60 μm. In the present invention, even if the thickness of the inorganic glass is reduced, the transparent substrate that significantly prevents the progress of a crack in the thin-plate glass and the rupture of the glass, and is excellent in impact resistance and bending property can be obtained. When the thickness of the inorganic glass is more than 100 μm, the transparent substrate showing sufficient bending property may not be obtained. When the thickness of the inorganic glass is less than 10 μm, the transparent substrate may become difficult to handle.

The light transmittance of the inorganic glass at a wavelength of 550 nm is preferably 85% or more. A refractive index $n_g$ of the inorganic glass at a wavelength of 550 nm is preferably 1.4 to 1.65.

The density of the inorganic glass is preferably 2.3 g/cm³ to 3.0 g/cm³, more preferably 2.3 g/cm³ to 2.7 g/cm³. With the inorganic glass in the above-mentioned range, a lightweight transparent substrate is obtained.

As a method of forming the inorganic glass, any appropriate method can be adopted. Typically, the inorganic glass is produced by melting a mixture containing a main material such as silica and alumina, an antifoaming agent such as salt cake and antimony oxide, and a reducing agent such as carbon at a temperature of 1400° C. to 1600° C. to form a thin plate, followed by cooling. Examples of the method of forming a thin plate of the inorganic glass include a slot down draw method, a fusion method, and a float method. The inorganic glass formed into a plate shape by those methods may be chemically polished with a solvent such as hydrofluoric acid, if required, in order to reduce the thickness and enhance smoothness.

As the inorganic glass, commercially available inorganic glass may be used as it is, or commercially available inorganic glass may be polished so as to have a desired thickness. Examples of the commercially available inorganic glass include "7059," "1737," or "EAGLE 2000" each manufactured by Corning Incorporated, "AN100" manufactured by Asahi Glass Co., Ltd., "NA-35" manufactured by NH Technoglass Corporation, "OA-10" manufactured by Nippon Electric Glass Co., Ltd., and "D263" or "AF45" each manufactured by SCHOTT AG.

C. Resin Layer

The thickness of the resin layer is preferably 5 μm to 100 μm, more preferably 10 μm to 80 μm, particularly preferably 15 μm to 60 μm. When the thickness falls within such range, a resin layer which sufficiently reinforces the thin-plate glass and hardly peels off the thin-plate glass can be obtained. When the resin layer is placed on each of both sides of the thin-plate glass, respective resin layers may have the same thickness or may have different thicknesses. The respective resin layers preferably have the same thickness. With such construction, warping and waviness are hard to occur because thermal stresses are uniformly applied to both surfaces of the thin-plate glass even when a heating treatment is performed.

The shrinkage stress of the resin layer on the thin-plate glass is 5 MPa or more, preferably 5 MPa to 100 MPa, more preferably 5 MPa to 50 MPa, particularly preferably 10 MPa to 50 MPa, most preferably 10 MPa to 25 MPa. As long as the shrinkage stress of the resin layer falls within such range, the reinforcing effect of the resin layer on the thin-plate glass becomes conspicuous while the resin layer and the thin-plate glass, the coupling agent layer, or the adhesion layer have sufficient adhesiveness. Accordingly, a transparent substrate that prevents the progress of a crack in the thin-plate glass and the rupture of the glass, and is excellent in bending property can be obtained. More specifically, the rupture of the thin-plate glass is caused by the concentration of a tensile stress on a crack when the thin-plate glass receives an external force in its tensile direction. In the transparent substrate of the present invention, however, the resin layer has a shrinkage stress in the range and hence the tensile stress which the crack receives is reduced by the shrinkage stress. As a result, a transparent substrate that can prevent the progress of a crack in the thin-plate glass and the rupture of the glass even against an additionally large external force in the tensile direction, and is excellent in bending property can be obtained.

The resin layer has a modulus of elasticity at 25° C. of preferably 1.0 GPa or more, more preferably 1.0 GPa to 15 GPa, particularly preferably 1.5 GPa to 7 GPa, most preferably 1.8 GPa to 4 GPa. As long as the modulus of elasticity of the resin layer falls within such range, the resin layer alleviates a local stress in a defect in the thin-plate glass. Accordingly, the thin-plate glass hardly cracks or ruptures.

The resin layer has a fracture toughness value at 25° C. of preferably 1.5 MPa·m$^{1/2}$ or more, more preferably 2 MPa·m$^{1/2}$ to 6 MPa·m$^{1/2}$, particularly preferably 2 MPa·m$^{1/2}$ to 5 MPa·m$^{1/2}$. As long as the fracture toughness value of the resin layer falls within such range, the resin layer has sufficient toughness, and hence a transparent substrate in which the thin-plate glass is reinforced so that the progress of a crack in the thin-plate glass and the rupture of the glass may be prevented and which is excellent in bending property can be obtained. In addition, even if the thin-plate glass ruptures in the transparent substrate, the resin layer hardly ruptures, and hence the scattering of the thin-plate glass is prevented by the resin layer and the shape of the transparent substrate is maintained. Accordingly, the contamination of facilities in production steps for display devices and solar cells can be prevented, and an improvement in yield can be achieved.

The resin in the resin layer has a glass transition temperature of preferably 150° C. to 350° C., more preferably 180° C. to 320° C., particularly preferably 210° C. to 290° C. A transparent substrate excellent in heat resistance can be obtained as long as the glass transition temperature of the resin in the resin layer falls within such range.

The resin layer preferably has a light transmittance at a wavelength of 550 nm of 80% or more. The resin layer preferably has a refractive index at a wavelength of 550 nm of 1.3 to 1.7.

The resin layer has a coefficient of linear expansion of preferably 5 ppm/° C. to 100 ppm/° C., more preferably 5 ppm/° C. to 50 ppm/° C. The coefficient of linear expansion of the resin layer is preferably 20 or less times, more preferably 10 or less times, particularly preferably 1 to 4 times as high as the coefficient of linear expansion of the thin-plate glass.

Any appropriate resin can be adopted as a material for constructing the resin layer as long as an effect of the present invention is obtained. Examples of the resin include a thermoplastic resin and a curable resin that cures with heat or an active energy ray. The resin is preferably a thermoplastic resin. Specific examples of the resin include: a polyether sulfone-based resin; a polycarbonate-based resin; an epoxy-based resin; an acrylic resin; polyester-based resins such as a polyethylene terephthalate and polyethylene naphthalate; a polyolefin-based resin; cycloolefin-based resins such as a norbornene-based resin; a polyimide-based resin; a polyamide-based resin; a polyimideamide-based resin; a polyarylate-based resin; a polysulfone-based resin; a polyether imide-based resin; and fumaric acid-based resins such as a fumaric acid ester-based resin.

The resin layer preferably contains a thermoplastic resin (A) having repeating units represented by the following general formula (1) and/or the following general formula (2). The incorporation of the thermoplastic resin (A) can provide a resin layer excellent in adhesiveness with the thin-plate glass, the coupling agent layer, or the adhesion layer and toughness. As a result, a transparent substrate in which a crack hardly progresses at the time of cutting can be obtained. In addition, fluctuations in dimensions of the thermoplastic resin (A) excellent in adhesiveness with the thin-plate glass, the coupling agent layer, or the adhesion layer as described above are small because the thermoplastic resin is strongly restrained by the thin-plate glass. As a result, the transparent substrate including the resin layer containing the thermoplastic resin (A) shows excellent dimensional stability.

[Chem. 1]

In the formula (1): $R_1$ represents a substituted or unsubstituted aromatic hydrocarbon group having 6 to 24 carbon atoms, an alicyclic hydrocarbon group having 4 to 14 carbon atoms, or a linear or branched aliphatic hydrocarbon group having 1 to 8 carbon atoms, preferably a substituted or unsubstituted aromatic hydrocarbon group having 6 to 20 carbon atoms, an alicyclic hydrocarbon group having 4 to 12 carbon atoms, or a linear or branched aliphatic hydrocarbon group having 1 to 6 carbon atoms, more preferably a substituted or unsubstituted aromatic hydrocarbon group having 6 to 18 carbon atoms, an alicyclic hydrocarbon group having 5 to 10 carbon atoms, or a linear or branched aliphatic hydrocarbon group having 1 to 4 carbon atoms; and $R_2$ represents a substituted or unsubstituted aromatic hydrocarbon group having 6 to 24 carbon atoms, a linear or branched aliphatic hydrocarbon group having 1 to 8 carbon atoms, an alicyclic hydrocarbon group having 5 to 12 carbon atoms, or a hydrogen atom, preferably a substituted or unsubstituted aromatic hydrocarbon group having 6 to 20 carbon atoms, a linear or branched aliphatic hydrocarbon group having 1 to 6 carbon atoms, an alicyclic hydrocarbon group having 5 to 10 carbon atoms, or a hydrogen atom. In the formula (2): $R_3$ and $R_4$ each independently represent a linear or branched aliphatic hydrocarbon group having 1 to 8 carbon atoms, a hydrogen atom, or an alicyclic hydrocarbon group having 5 to 12 carbon atoms, preferably a linear or branched aliphatic hydrocarbon group having 1 to 5 carbon atoms, a hydrogen atom, or an alicyclic hydrocarbon group having 5 to 10 carbon atoms, more preferably a linear or branched aliphatic hydrocarbon group having 1 to 4 carbon atoms, a hydrogen atom, or an alicyclic hydrocarbon group having 5 to 8 carbon atoms; A represents a carbonyl group or a linear or branched aliphatic hydrocarbon group having 1 to 8 carbon atoms, preferably a carbonyl group or a linear or branched aliphatic hydrocarbon group having 1 to 6 carbon atoms, more preferably a carbonyl group or a linear or branched aliphatic hydrocarbon group having 1 to 4 carbon atoms; m represents an integer of 0 to 8, preferably an integer of 0 to 6, more preferably an integer of 0 to 3; and n represents an integer of 0 to 4, preferably an integer of 0 to 2.

The thermoplastic resin (A) has a polymerization degree of preferably 10 to 6,000, more preferably 20 to 5,000, particularly preferably 50 to 4,000.

Specific examples of the thermoplastic resin (A) include a styrene-maleic anhydride copolymer and an ester group-containing cycloolefin polymer. Those thermoplastic resins may be used alone or as a mixture.

The resin layer preferably contains a thermoplastic resin (B) having one or more repeating units represented by the following general formula (3). The incorporation of the thermoplastic resin (B) can provide a resin layer excellent in adhesiveness with the thin-plate glass, the coupling agent layer, or the adhesion layer and toughness. As a result, a transparent substrate in which a crack hardly progresses at the time of cutting can be obtained. In addition, fluctuations in dimensions of the thermoplastic resin (B) excellent in adhesiveness with the thin-plate glass, the coupling agent layer, or the adhesion layer as described above are small because the thermoplastic resin is strongly restrained by the thin-plate glass. As a result, the transparent substrate including the resin layer containing the thermoplastic resin (B) shows excellent dimensional stability.

[Chem. 2]

(3)

In the formula (3): $R_5$ represents a substituted or unsubstituted aromatic hydrocarbon group having 6 to 24 carbon atoms, a linear or branched aliphatic hydrocarbon group having 1 to 8 carbon atoms, an alicyclic hydrocarbon group having 4 to 14 carbon atoms, or an oxygen atom, preferably a substituted or unsubstituted aromatic hydrocarbon group having 6 to 20 carbon atoms, a linear or branched aliphatic hydrocarbon group having 1 to 6 carbon atoms, an alicyclic hydrocarbon group having 4 to 12 carbon atoms, or an oxygen atom, more preferably a substituted or unsubstituted aromatic hydrocarbon group having 6 to 18 carbon atoms, a linear or branched aliphatic hydrocarbon group having 1 to 4 carbon atoms, an alicyclic hydrocarbon group having 5 to 10 carbon atoms, or an oxygen atom; and $R_6$ represents a substituted or unsubstituted aromatic hydrocarbon group having 6 to 24 carbon atoms, a linear or branched aliphatic hydrocarbon group having 1 to 8 carbon atoms, an alicyclic hydrocarbon group having 5 to 12 carbon atoms, or a hydrogen atom, preferably a substituted or unsubstituted aromatic hydrocarbon group having 6 to 20 carbon atoms, a linear or branched aliphatic hydrocarbon group having 1 to 6 carbon atoms, an alicyclic hydrocarbon group having 5 to 10 carbon atoms, or a hydrogen atom.

The thermoplastic resin (B) has a polymerization degree of preferably 10 to 6,000, more preferably 20 to 5,000, particularly preferably 50 to 4,000.

Specific examples of the thermoplastic resin (B) include polyarylate, polyester, and polycarbonate. Those thermoplastic resins may be used alone or as a mixture.

The resin layer preferably has a thermoplastic resin (C) having a hydroxyl group at any one of its terminals. The thermoplastic resin (C) is suitably used when the transparent substrate includes a coupling agent layer formed of an epoxy group-terminated coupling agent. Specific examples of the thermoplastic resin (C) include thermoplastic resins obtained by modifying the terminals of a polyimide, a polyimideamide, a polyether sulfone, a polyether imide, a polysulfone, a polyarylate, and a polycarbonate with hydroxyl groups. Those thermoplastic resins may be used alone or as a mixture. The use of any such thermoplastic resin can provide a resin layer excellent in adhesiveness with the coupling agent layer formed of the epoxy group-terminated coupling agent and toughness. As a result, a transparent substrate in which a crack hardly progresses at the time of cutting can be obtained. In addition, fluctuations in dimensions of the thermoplastic resin (C) excellent in adhesiveness with the coupling agent layer formed of the epoxy group-terminated coupling agent as described above are small because the thermoplastic resin is strongly restrained by the thin-plate glass. As a result, the transparent substrate including the resin layer containing the thermoplastic resin (C) shows excellent dimensional stability. It should be noted that any appropriate method can be employed for the modification of the terminals with hydroxyl groups. In addition, details about the epoxy group-terminated coupling agent are described later.

The thermoplastic resin (C) has a polymerization degree of preferably 90 to 6,200, more preferably 130 to 4,900, particularly preferably 150 to 3,700.

In terms of polyethylene oxide, the weight-average molecular weight of the thermoplastic resin (C) is preferably $2.0 \times 10^4$ to $150 \times 10^4$, more preferably $3 \times 10^4$ to $120 \times 10^4$, particularly preferably $3.5 \times 10^4$ to $90 \times 10^4$. When the weight-average molecular weight of the thermoplastic resin (C) is less than $2.0 \times 10^4$, the toughness of the resin layer becomes insufficient and the effect of reinforcing the thin-plate glass may become insufficient. When the weight-average molecular weight of the thermoplastic resin (C) is more than $150 \times 10^4$, the resin has an excessively high viscosity and hence may become difficult to handle.

The hydroxyl group is preferably a phenolic hydroxyl group. As long as the thermoplastic resin (C) has a phenolic hydroxyl group, the resin layer and the coupling agent layer formed of the epoxy group-terminated coupling agent can be caused to adhere to each other strongly.

The content of the hydroxyl group is preferably 0.3 or more, more preferably 0.5 to 2.0 per polymerization degree of the thermoplastic resin (C) of 100. As long as the content of the hydroxyl group falls within such range, a thermoplastic resin excellent in reactivity with the epoxy group-terminated coupling agent can be obtained.

When the resin layer contains the thermoplastic resin (C), the resin layer preferably further contains imidazoles, epoxies, and/or oxetanes. When the resin layer contains the imidazoles, the epoxies, and/or the oxetanes, the resin layer and the thin-plate glass having the epoxy group-terminated coupling agent layer can be caused to adhere to each other stably, and hence the transparent substrate can be obtained in high yield. The content of the imidazoles is preferably 0.5 wt % to 5 wt %, more preferably 1 wt % to 4 wt % with respect to the thermoplastic resin (C). The content of the epoxies is preferably 1 wt % to 15 wt %, more preferably 3 wt % to 10 wt % with respect to the thermoplastic resin (C). The content of the oxetanes is preferably 0.5 wt % to 10 wt %, more preferably 1 wt % to 5 wt % with respect to the thermoplastic resin (C).

Examples of the imidazoles include 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, an epoxy-imidazole adduct, 2,3-dihydro-1H-pyrrolo[1,2-a]benzimidazole, 1-dodecyl-2-methyl-3-benzylimidazolium chloride, 2-phenyl-4,5-dihydroxymethylimidazole, 2-phenyl-4-methyl-5-hydroxymethylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, and 2,4-diamino-6-[2'-ethyl-4'-methylimidazolyl-(1')]-ethyl-s-triazine.

As the epoxies, any appropriate resin can be used as long as the resin has an epoxy group in any one of its molecules. Examples of the epoxies include epoxy-based resins including: bisphenol types such as a bisphenol A type, a bisphenol F type, a bisphenol S type, and hydrogenated products thereof; novolac types such as a phenol novolac type and a cresol novolac type; nitrogen-containing cyclic types such as a triglycidylisocyanurate type and a hydantoin type; alicyclic types; aliphatic types; aromatic types such as a naphthalene type and a biphenyl type; glycidyl types such as a glycidyl ether type, a glycidyl amine type, and a glycidyl ester type; dicyclo types such as a dicyclopentadiene type; ester types; ether ester types; and modified types thereof. Those epoxy-based resins may be used alone or as a mixture.

The epoxies are preferably a bisphenol A type epoxy-based resin, an alicyclic type epoxy-based resin, a nitrogen-containing cyclic type epoxy-based resin, or a glycidyl type epoxy-based resin.

The oxetanes are preferably compounds each represented by the following general formula (4), (5), or (6).

[Chem. 3]

(4)

In the formula (4), $R_7$ represents a hydrogen atom, an alicyclic hydrocarbon group, a phenyl group, a naphthyl group, or an aliphatic hydrocarbon group having 1 to 10 carbon atoms.

[Chem. 4]

(5)

[Chem. 5]

(6)

In the formula (6), $R_8$ represents an alicyclic hydrocarbon group, a phenyl group, a naphthyl group, or an aliphatic hydrocarbon group having 1 to 10 carbon atoms, and p represents an integer of 1 to 5.

Examples of the oxetanes include 3-ethyl-3-hydroxymethyloxetane (oxetane alcohol), 2-ethylhexyloxetane, xylylenebisoxetane, and 3-ethyl-3(((3-ethyloxetane-3-yl)methoxy)methyl)oxetane.

The thermoplastic resin (A), the thermoplastic resin (B), and the thermoplastic resin (C) may be used alone or as a mixture.

The resin layer may be a single layer, or may be a multilayer body. In one embodiment, the resin layer is a multilayer body having a layer containing the thermoplastic resin (A), and a layer containing a thermoplastic resin free of repeating units represented by the general formulae (1) and (2). In another embodiment, the resin layer is a multilayer body having a layer containing the thermoplastic resin (B) and a layer containing a thermoplastic resin free of a repeating unit represented by the general formula (3). As long as the resin layer is any such multilayer body, a transparent substrate excellent in mechanical strength and heat resistance can be obtained.

When the resin layers are placed on both sides of the thin-plate glass, the respective resin layers may be constructed of the same resin or resins having the same characteristics, or may be constructed of different resins. It is preferred that the respective resin layers be constructed of the same resin. It is most preferred that the respective resin layers be constructed of the same resin so as to have the same thickness. With such construction, a thermal stress is uniformly applied to both surfaces of the thin-plate glass even when a heating treatment is performed. Accordingly, warping and waviness are very hard to occur.

The resin layer preferably has chemical resistance. Specifically, the resin layer preferably has chemical resistance to a solvent used in, for example, a washing step or resist peeling step upon production of display devices and solar cells. Examples of the solvent used in the washing step, a resist peeling liquid, or the like upon production of the display devices include isopropyl alcohol, acetone, dimethyl sulfoxide (DMSO), and N-methylpyrrolidone (NMP).

The resin layer can further contain any appropriate additive depending on purposes. Examples of the additive include a diluent, an antioxidant, a denaturant, a surfactant, a dye, a pigment, a discoloration preventing agent, a UV absorber, a softening agent, a stabilizer, a plasticizer, an antifoaming agent, and a stiffener. The kind, number, and amount of an additive to be incorporated in the resin layer can be set appropriately depending on purposes.

D. Coupling Agent Layer

The coupling agent layer is formed by, for example, curing a coupling agent on the thin-plate glass. Examples of the coupling agent include an amino group-containing coupling agent, an epoxy group-containing coupling agent, an epoxy group-terminated coupling agent, an isocyanate group-containing coupling agent, a vinyl group-containing coupling agent, a mercapto group-containing coupling agent, and a (meth)acryloxy group-containing coupling agent.

When the resin layer contains a thermoplastic resin having an ester bond (such as the thermoplastic resin (A) or the thermoplastic resin (B)), an amino group-containing coupling agent, an epoxy group-containing coupling agent, or an isocyanate group-containing coupling agent is suitably used as the coupling agent. The substitution positions of the substituents of those coupling agents may be the terminals of the molecules, or may not be the terminals. When the resin layer containing the thermoplastic resin having an ester bond and the thin-plate glass are placed only through a coupling agent layer formed of any such coupling agent (that is, without through any adhesion layer), the resin layer containing the thermoplastic resin having an ester bond can strongly adhere to the thin-plate glass through the coupling agent layer. It should be noted that an amino group, epoxy group, or isocyanate group in the coupling agent is assumed to be chemically bonded to, or to interact with, the resin layer, and a silyl group in the coupling agent can be chemically bonded to a substituent (such as a hydroxyl group) of the thin-plate glass. Probably as a result of the foregoing, such strong adhesiveness as described above is obtained.

When the resin layer contains a thermoplastic resin having a hydroxyl group (such as the thermoplastic resin (C)), an epoxy group-terminated coupling agent is suitably used as the coupling agent. When the resin layer containing the thermoplastic resin having a hydroxyl group and the thin-plate glass are placed only through a coupling agent layer formed of any such coupling agent (that is, without through any adhesion layer), the resin layer containing the thermoplastic resin having a hydroxyl group can strongly adhere to the thin-plate glass through the coupling agent layer. It should be noted that an epoxy group in the coupling agent is assumed to be chemically bonded to, or to interact with, the resin layer, and a silyl group in the coupling agent can be chemically bonded to a substituent (such as a hydroxyl group) of the thin-plate glass. Probably as a result of the foregoing, such strong adhesiveness as described above is obtained.

The amino group-containing coupling agent is preferably an alkoxy silane having an amino group or a halogenated silane having an amino group, particularly preferably an alkoxy silane having an amino group.

Specific examples of the alkoxy silane having an amino group include 3-aminopropyltrimethoxysilane, 3-aminopropylmethyldimethoxysilane, 3-aminopropyldimethylmethoxysilane, 3-aminopropyltriethoxysilane, 3-aminopropylmethyldiethoxysilane, 3-aminopropylmethyldimethoxysilane, 6-aminohexyltrimethoxysilane, 6-aminohexyltriethoxysilane, 11-aminoundecyltrimethoxysilane, 11-aminoundecyltriethoxysilane, and 3-triethoxysilyl-N-(1,3-dimethyl-butylidene)propylamine.

Specific examples of the halogenated silane having an amino group include 3-aminopropyltrichlorosilane, 3-aminopropylmethyldichlorosilane, 3-aminopropyldimethylchlorosilane, 6-aminohexyltrichlorosilane, and 11-aminoundecyltrichlorosilane.

Specific examples of the epoxy group-containing coupling agent and the epoxy group-terminated coupling agent include 2-(3,4-epoxycyclohexyl)ethyltrimethoxysilane, 3-glycidoxypropyltrimethoxysilane, 3-glycidoxypropylmethyldiethoxysilane, and 3-glycidoxypropyltriethoxysilane.

Specific examples of the isocyanate group-containing coupling agent include 3-isocyanatepropyltriethoxysilane.

Specific examples of the vinyl group-containing coupling agent include vinyltrichlorosilane, vinyltris(β-methoxyethoxy)silane, vinyltriethoxysilane, vinylmethoxysilane, and γ-methacryloxypropyltrimethoxysilane.

Specific examples of the mercapto group-containing coupling agent include mercaptomethyldimethylethoxysilane, (mercaptomethyl)methyldiethoxysilane, γ-mercaptopropylmethyldimethoxysilane, γ-mercaptopropyltrimethoxysilane, and γ-mercaptopropyltriethoxysilane.

Specific examples of the (meth)acryloxy group-containing coupling agent include γ-(meth)acryloxypropyltrimethoxysilane, γ-(meth)acryloxypropyltriethoxysilane, γ-(meth)acryloxypropylmethyldimethoxysilane, and γ-(meth)acryloxypropylmethyldiethoxysilane.

The coupling agent may be a commercially available coupling agent. Examples of commercially available amino group-containing coupling agents include trade name "KBM-602" (N-2-(aminoethyl)-3-aminopropylmethyldimethoxysilane), trade name "KBM-603" (N-2-(aminoethyl)-3-aminopropyltrimethoxysilane), trade name "KBE-603" (N-2-(aminoethyl)-3-aminopropyltriethoxysilane), trade name "KBM-903" (3-aminopropyltrimethoxysilane), trade name "KBE-903" (3-aminopropyltriethoxysilane), trade name "KBM-573" (N-phenyl-3-aminopropyltrimethoxysilane), and trade name "KBE-9103" (3-triethoxysilyl-N-(1,3-dimethyl-butylidene)propylamine), all of which are manufactured by Shin-Etsu Chemical Co., Ltd. Examples of commercially available epoxy group-containing coupling agents (and epoxy group-terminated coupling agents) include trade name "KBM-303" (2-(3,4-epoxycyclohexyl) ethyltrimethoxysilane), trade name "KBM-403" (3-glycidoxypropyltrimethoxysilane), trade name "KBE-402" (3-glycidoxypropylmethyldiethoxysilane), and trade name "KBE-403" (3-glycidoxypropyltriethoxysilane), all of which are manufactured by Shin-Etsu Chemical Co., Ltd. Examples of commercially available isocyanate group-containing coupling agents include trade name "KBE-9007" (3-isocyanatepropyltriethoxysilane) manufactured by Shin-Etsu Chemical Co., Ltd.

The thickness of the coupling agent layer is preferably 0.001 μm to 10 μm, more preferably 0.001 μm to 2 μm.

E. Adhesion Layer

Any appropriate resin can be adopted as a material for constructing the adhesion layer. Examples of the material for constructing the adhesion layer include a thermosetting resin and an active energy ray-curable resin. Specific examples of such resins include cyclic ethers, silicone-based resins, and acrylic resins each having, for example, an epoxy group, glycidyl group, or oxetanyl group, and mixtures of these resins. In addition, the coupling agent may be added to the adhesion layer. The addition of the coupling agent to the adhesion layer can improve adhesion with the thin-plate glass and/or the resin layer (when the transparent substrate has the coupling agent layer, adhesion with the coupling agent layer and/or the resin layer).

The adhesion layer has a thickness of preferably 10 μm or less, more preferably 0.01 μm to 10 μm, particularly preferably 0.1 μm to 7 μm. As long as the thickness of the adhesion layer falls within such range, excellent adhesiveness between the thin-plate glass and the resin layer can be realized without the impairment of the bending property of the transparent substrate.

The adhesion layer preferably has as high a modulus of elasticity as possible. This is because as the modulus of elasticity of the adhesion layer increases, the stress of the resin layer is more favorably transferred to the thin-plate glass. However, an adhesive having a modulus of elasticity of more than 15 GPa is rare. Accordingly, as a matter of practicality, the modulus of elasticity of the adhesion layer is preferably 1 GPa to 15 GPa, more preferably 1.5 GPa to 15 GPa, particularly preferably 1.5 GPa to 7 GPa, most preferably 1.8 GPa to 4 GPa.

F. Other Layer

The transparent substrate can include any appropriate other layer on the side of the resin layer opposite to the thin-plate glass (i.e., outermost layer of the transparent substrate) as required. Examples of the other layer include a hard coat layer a transparent conductive layer.

The hard coat layer has a function of imparting chemical resistance, abrasion resistance, and surface smoothness to the transparent substrate.

Any appropriate material can be adopted as a material for constructing the hard coat layer. Examples of the material for constructing the hard coat layer include epoxy-based resins, acrylic resins, silicone-based resins, and mixtures of these resins. Of those, epoxy-based resins each of which is excellent in heat resistance are preferred. The hard coat layer can be obtained by curing any such resin with heat or an active energy ray.

The hard coat layer has a pencil hardness of preferably H or more, more preferably 2H or more.

The transparent conductive layer can function as an electrode or an electromagnetic wave shield upon use of the transparent substrate as a substrate for a display device or solar cell.

A material that can be used in the transparent conductive layer is, for example, a metal such as copper or silver, a metal oxide such as an indium tin oxide (ITO) or an indium zinc oxide (IZO), a conductive polymer such as a polythiophene or a polyaniline, or a composition containing a carbon nanotube.

G. Method of Producing Transparent Substrate

A method of producing the transparent substrate of the present invention is, for example, a method involving forming the resin layer on the thin-plate glass by solution application to provide the transparent substrate or a method involving attaching a resin film onto the thin-plate glass through the adhesion layer to form the resin layer so that the transparent substrate may be obtained.

The method involving forming the resin layer on the thin-plate glass by the solution application to provide the transparent substrate preferably includes the steps of: applying a solution of a resin to one side, or each of both sides, of the thin-plate glass to form an applied layer; and drying the applied layer. The resin used here is as described in the section C.

As an application solvent to be used in the application step, there are given: halogen-based solvents such as methylene chloride, ethylene chloride, chloroform, carbon tetrachloride, and trichloroethane; aromatic solvents such as toluene, benzene, and phenol; cellosolve-based solvents such as methyl cellosolve and ethyl cellosolve; ether-based solvents such as propylene glycol monomethyl ether and ethylene glycol monoisopropyl ether; and ketone-based solvents such as methyl ethyl ketone, methyl isobutyl ketone, cyclopentanone, and cyclohexanone; and the like. Of those, halogen-based solvents, aromatic solvents, cellosolve-based solvents, and ether-based solvents are preferred. The use of any such solvent as the application solvent can provide a transparent substrate having sufficiently maintained adhesiveness between the resin layer and the thin-plate glass and excellent in reliable durability even at high temperature and high humidity.

As an application method for the solution of the resin, there are given: coating methods such as air doctor coating, blade coating, knife coating, reverse coating, transfer roll coating, gravure roll coating, kiss coating, cast coating, spray coating, slot orifice coating, calender coating, electrodeposition coating, dip coating, and die coating; and printing methods including relief printing methods such as flexographic printing, intaglio printing methods such as a direct gravure printing method and an offset gravure printing method, planographic printing methods such as an offset printing method, and stencil printing methods such as a screen printing method.

Any appropriate drying method (for example, natural drying, forced-air drying, or heat drying) may be employed as a method for the drying step. For example, in the case of heat drying, a drying temperature is typically 100° C. to 200° C. and a drying time is typically 1 minute to 20 minutes. The heat drying may be performed at gradually varied heating temperature.

The method preferably includes a coupling treatment for the surface of the thin-plate glass before the applying step. The formation of a coupling agent layer by the coupling treatment allows the resin layer to strongly adhere to the thin-plate glass through the coupling agent layer. A coupling agent used here is as described in the section D.

Any appropriate method can be adopted as a method for the coupling treatment. The method is specifically, for example, a method involving applying a solution of the coupling agent to the surface of the thin-plate glass and heat-treating the resultant.

Any appropriate solvent can be used as a solvent used upon preparation of the solution of the coupling agent as long as the solvent does not react with the coupling agent. Examples of the solvent include: aliphatic hydrocarbon-based solvents such as hexane and hexadecane; aromatic solvents such as benzene, toluene, and xylene; halogen hydrocarbon-based solvents such as methylene chloride and 1,1,2-trichloroethane; ether-based solvents such as tetrahydrofuran and 1,4-dioxane; alcohol-based solvents such as methanol and propanol; ketone-based solvents such as acetone and 2-butanone; and water.

Any appropriate method for heat treatment may be employed as a method for heat treatment at the time of the coupling treatment. Typically, a heat treatment temperature is 50° C. to 150° C. and a heat treatment time is 1 minute to 10 minutes. The heat treatment allows the coupling agent to be bonded to the thin-plate glass surface through a chemical bond.

In the method involving attaching the resin film onto the thin-plate glass to form the resin layer so that the transparent substrate may be obtained, the resin layer may be formed by: applying a solution of a resin to any appropriate base material to form the resin film; and transferring the resin film onto the surface of the thin-plate glass to attach the thin-plate glass and the resin film. Alternatively, the thin-plate glass may be subjected to a coupling treatment before the attachment of the resin film. The above-mentioned method can be adopted as a method for the coupling treatment.

The resin film may be subjected to an annealing treatment before or after its attachment to the thin-plate glass. Impurities such as a residual solvent and an unreacted monomer component can be efficiently removed by performing the heat treatment.

The resin film is preferably attached to the surface of the thin-plate glass through the adhesion layer. The adhesion layer may be attached to the surface of the thin-plate glass after having been formed on the resin film, or the resin film may be attached after the adhesion layer has been formed on the thin-plate glass. A material for constructing the adhesion layer is as described in the section E.

A method of forming the adhesion layer is, for example, a method involving: applying a thermosetting resin or active energy ray-curable resin to the surface of the thin-plate glass or resin film; attaching the thin-plate glass and the resin film after the application to form a laminate; and curing the thermosetting resin or active energy ray-curable resin by subjecting the laminate to a heating treatment or UV irradiation after the attachment. Typical conditions for the UV irradiation are as described below. An irradiation cumulative light quantity is 100 $mJ/cm^2$ to 2,000 $mJ/cm^2$, and an irradiation time is 5 minutes to 30 minutes. Typical conditions for the heating treatment are as described below. A heating temperature is 100° C. to 200° C., and a heating time is 5 minutes to 30 minutes. It should be noted that the thermosetting resin or the active energy ray-curable resin may be semi-cured after the application of the thermosetting resin or the active energy ray-curable resin to the surface of the thin-plate glass or resin film and before the attachment of the thin-plate glass and the resin film. The semi-curing can be performed by, for example, applying UV light at 1 $mJ/cm^2$ to 10 $mJ/cm^2$ for 1 second to 60 seconds.

H. Applications

The transparent substrate of the present invention may be used for any appropriate display device, solar cell, or lighting device. Examples of the display device include a liquid crystal display, a plasma display, an organic EL display, and electronic paper. The lighting device is, for example, an organic EL device.

EXAMPLES

Hereinafter, the present invention is described specifically by way of examples. However, the present invention is by no means limited to those examples. It should be noted that a thickness was measured using a digital micrometer "KC-351C type" manufactured by Anritsu Corporation.

Example 1

A polyether sulfone (Sumika Excel 5003P manufactured by Sumitomo Chemical Company, Limited), cyclopentanone, dimethyl sulfoxide, and a leveling agent (BYK-307 manufactured by BYK-Chemie) were mixing at a weight ratio (polyether sulfone:cyclopentanone:dimethyl sulfoxide: leveling agent) of 140:658:42:0.105. Thus, a casting solution (A) was obtained.

Separately, one surface of a thin-plate glass measuring 50 µm thick by 30 mm wide by 100 mm long was washed with methyl ethyl ketone, and was then subjected to a corona treatment. Subsequently, an epoxy group-terminated coupling agent (KBM-403 manufactured by Shin-Etsu Chemical Co., Ltd.) was applied to the surface, and was then subjected to a heat treatment at 110° C. for 5 minutes. The casting solution (A) was applied to the surface of the thin-plate glass subjected to the coupling treatment as described above, and was then dried at 70° C. for 4 minutes, at 150° C. for 4 minutes, and at 200° C. for 10 minutes. Thus, a resin layer having a thickness of 38 µm was obtained. The other surface of the thin-plate glass was also subjected to the same treatment. Thus, a transparent substrate having a total thickness of 126 µm was obtained.

It should be noted that the thin-plate glass was exposed from an end portion in the widthwise direction (end portion on the longitudinal side) of the transparent substrate measuring 10 mm by 100 mm.

Example 2

A polyarylate (U-100 manufactured by Unitika Limited), trichloroethane, and a leveling agent (BYK-302 manufactured by BYK-Chemie) were mixed at a weight ratio (polyarylate:trichloroethane:leveling agent) of 15:85:0.1. Thus, a casting solution (B) was obtained.

The casting solution (B) was applied to the surface of a polyethylene terephthalate film, and was then dried at 110° C. for 12 minutes. After that, the polyethylene terephthalate film was released. Thus, a resin film having a thickness of 35 µm was obtained.

A mixed solution obtained by mixing an epoxy-based resin (CELLOXIDE 2021P manufactured by Daicel Chemical Industries, Ltd.), an oxetane-based resin (OXT-221 manufactured by Toagosei Company, Limited), and a polymerization initiator (ADEKA OPTOMER SP-170 manufactured by ADEKA CORPORATION) at a weight ratio (epoxy-based resin:oxetane-based resin:polymerization initiator) of 90:10:3 was applied to the resin film. After that, the solution was dried at 40° C. for 1 minute. Thus, an adhesion layer having a thickness of 3 µm was formed on the resin film.

Separately, one surface of a thin-plate glass measuring 50 µm thick by 30 mm wide by 100 mm long was washed with methyl ethyl ketone, and was then subjected to a corona treatment. Subsequently, an epoxy group-terminated coupling agent (KBM-403 manufactured by Shin-Etsu Chemical Co., Ltd.) was applied to the surface, and was then subjected to a heat treatment at 110° C. for 5 minutes. The resin film was attached to the surface of the thin-plate glass subjected to the coupling treatment as described above from the side of the adhesion layer, and then UV light was applied (intensity: 400 mJ/cm$^2$ or more) with a high-pressure mercury lamp to cure the adhesion layer. After that, the resultant was further subjected to a heating treatment at 150° C. for 5 minutes to form a resin layer on the thin-plate glass subjected to the coupling treatment through the adhesion layer. The other surface of the thin-plate glass was also subjected to the same treatment. Thus, a transparent substrate having a total thickness of 126 µm was obtained.

It should be noted that the thin-plate glass was exposed from an end portion in the widthwise direction of the transparent substrate measuring 10 mm by 100 mm.

Example 3

A transparent substrate was obtained by placing a hard coat layer having a thickness of 3 µm on the side of the resin layer of the transparent substrate obtained in Example 1 opposite to the thin-plate glass. The hard coat layer was formed by: applying, to the surface of the resin layer, a mixed liquid of 75 parts of an epoxy-based resin (CELLOXIDE 2021P manufactured by Daicel Chemical Industries, Ltd.), 25 parts of an epoxy-based resin (EHPE 3150 manufactured by Daicel Chemical Industries, Ltd.), and 3 parts of a polymerization initiator (ADEKA OPTOMER SP-170 manufactured by ADEKA CORPORATION); and irradiating the applied liquid with UV light from a high-pressure mercury lamp (intensity: 400 mJ/cm$^2$ or more) to cure the applied liquid.

Example 4

A transparent substrate was obtained in the same manner as in Example 2 except that the adhesion layer was formed on the resin film after the resin film had been subjected to an annealing treatment at 150° C. for 5 minutes.

Example 5

Diisopropyl fumarate and toluene were mixed at a weight ratio (diisopropyl fumarate:toluene) of 9:1. Thus, a casting solution (C) was obtained.

One surface of a thin-plate glass measuring 50 µm thick by 30 mm wide by 100 mm long was separately washed with methyl ethyl ketone, and was then subjected to a corona treatment. Subsequently, an amino group-containing coupling agent (KBM-603 manufactured by Shin-Etsu Chemical Co., Ltd.) was applied to the surface and then subjected to a heat treatment at 110° C. for 5 minutes. The casting solution (C) was applied to the surface of the thin-plate glass subjected to the coupling treatment as described above, and was then dried at 100° C. for 5 minutes and at 130° C. for 15 minutes. Thus, a resin layer having a thickness of 37 µm was obtained. The other surface of the thin-plate glass was also subjected to the same treatment. Thus, a transparent substrate having a total thickness of 124 µm was obtained.

It should be noted that the thin-plate glass was exposed from an end portion in the widthwise direction of the transparent substrate measuring 10 mm by 100 mm.

Comparative Example 1

A transparent substrate was obtained in the same manner as in Example 2 except that: the adhesion layer was formed on the resin film after the resin film had been subjected to an annealing treatment at 200° C. for 10 minutes; and no heating treatment was performed after the curing of the adhesion layer.

Comparative Example 2

The casting solution (A) obtained in Example 1 was applied to the surface of a polyethylene terephthalate film, and was then dried at 100° C. for 10 minutes, at 130° C. for 10 minutes, and at 150° C. for 10 minutes. After that, the polyethylene terephthalate film was peeled. Thus, a resin film having a thickness of 35 μm was obtained.

After the resin film had been subjected to an annealing treatment at 200° C. for 5 minutes, a mixed solution obtained by mixing an epoxy-based resin (CELLOXIDE 2021P manufactured by Daicel Chemical Industries, Ltd.), an oxetane-based resin (OXT-221 manufactured by Toagosei Company, Limited), and a polymerization initiator (ADEKA OPTOMER SP-170 manufactured by ADEKA CORPORATION) at a weight ratio (epoxy-based resin:oxetane-based resin:polymerization initiator) of 90:10:3 was applied to the resin film. After that, the solution was dried at 40° C. for 1 minute. Thus, an adhesion layer having a thickness of 3 μm was formed on the resin film.

Separately, one surface of a thin-plate glass measuring 50 μm thick by 30 mm wide by 100 mm long was washed with methyl ethyl ketone, and was then subjected to a corona treatment. Subsequently, an epoxy group-terminated coupling agent (KBM-403 manufactured by Shin-Etsu Chemical Co., Ltd.) was applied to the surface, and was then subjected to a heat treatment at 110° C. for 5 minutes. The resin film was attached to the surface of the thin-plate glass subjected to the coupling treatment as described above from the side of the adhesion layer, and then UV light was applied (intensity: 400 mJ/cm² or more) with a high-pressure mercury lamp to cure the adhesion layer. Thus, a resin layer was formed on the thin-plate glass subjected to the coupling treatment through the adhesion layer. The other surface of the thin-plate glass was also subjected to the same treatment. Thus, a transparent substrate having a total thickness of 126 μm was obtained.

It should be noted that the thin-plate glass was exposed from an end portion in the widthwise direction of the transparent substrate measuring 10 mm by 100 mm.

Comparative Example 3

A resin composition mainly formed of epoxy-based resins represented by the following chemical formulae ((7):(8)=50:50 (weight ratio)) was interposed between release films each subjected to a silicone treatment, and then the resultant was passed through a gap between metal rolls fixed at an interval of 190 μm. Thus, a laminate including an epoxy-based resin layer having a thickness of 35 μm was obtained. Next, UV light was applied (intensity: 250 mJ/cm²) with a UV irradiation apparatus (conveyor speed: 2.5 m/min) from one side of the laminate to semi-cure the epoxy-based resin layer so that a semi-cured layer was formed.

Separately, one surface of a thin-plate glass measuring 50 μm thick by 30 mm wide by 100 mm long was washed with methyl ethyl ketone, and was then subjected to a corona treatment. Subsequently, an epoxy group-terminated coupling agent (KBM-403 manufactured by Shin-Etsu Chemical Co., Ltd.) was applied to the surface, and was then subjected to a heat treatment at 110° C. for 5 minutes.

Next, one release film of the laminate was removed, and then the semi-cured layer of the laminate was attached to the surface on one side of the thin-plate glass subjected to the coupling treatment with a laminator. The semi-cured layer was also attached to the other side of the thin-plate glass by performing the same operation. Next, the remaining release films were removed, and then the remainder was irradiated with UV light (intensity: 5,000 mJ/cm² or more) again. After that, the resultant was subjected to post baking (at 150° C. for 10 minutes) so that the semi-cured layers on both surfaces of the thin-plate glass were completely cured. Thus, a transparent substrate having a total thickness of 120 μm, the substrate having a resin layer having a thickness of 35 μm on each side, was obtained.

It should be noted that the thin-plate glass was exposed from an end portion in the widthwise direction of the transparent substrate measuring 10 mm by 100 mm.

[Chem. 6]

(7)

(8)

<Evaluation>

The transparent substrates obtained in the examples and the comparative examples were evaluated by the following methods. Table 1 shows the results.

(1) Bending Property (Rupture Diameter)

(a) The transparent substrates obtained in the examples and the comparative examples were prepared as samples for evaluation.

(b) A crack measuring 5 mm or less was produced at the center of a longitudinal side of the exposed portion of each thin-plate glass.

(c) The longitudinal side of each sample for evaluation was bent, the progress of the crack was observed, and the diameter of a circle using, as its circumference, the bent side (longitudinal side) upon rupture of the glass was defined as a rupture diameter.

(2) Coefficient of Linear Expansion

A piece measuring 2 mm by 30 mm was cut out of each of the transparent substrates obtained in the examples and the comparative examples, and was defined as a sample for evaluation.

The average coefficient of linear expansion of the sample for evaluation was calculated by measuring its TMA values (μm) at 30° C. to 170° C. with a TMA/SS150C (manufactured by Seiko Instruments Inc.).

Each of the resins for constructing the resin layers of the transparent substrates obtained in the examples and the comparative examples was evaluated for its shrinkage stress, fracture toughness value, and modulus of elasticity by the following methods. Table 1 shows the results.

(3) Shrinkage Stress

A resin layer was formed on a slot-shaped thin-plate glass measuring 30 mm wide by 125 mm long (thickness: 100 μm) in the same manner as in each of the examples and the comparative examples, and then a radius of curvature R of a curled sample was measured.

The shrinkage stress of the resin layer was determined by substituting, into Stoney's equation shown below (C. A. Klein, J. Appl. Phys., 88 5487 (2000)) into which a correction term had been introduced, the radius of curvature R, the Young's modulus (70 GPa), Poisson's ratio (0.2), and thickness (100 μm) of the thin-plate glass, and the Young's modulus, Poisson's ratio, and thickness of the resin layer.

$$\sigma = ((1+\lambda\delta^3)/(1+\delta)) * (E'_s * t_s^2/(6*R*t_f)) \sim (1/(1+\delta)) * (E'_s * t_s^2/(6*R*t_f))$$ [Eq. 1]

σ: The shrinkage stress (MPa)
$\chi$: $E'_f/E'_s$
$E'_f$: $E_f/(1-\gamma_f)$
$E'_s$: $E_s/(1-\gamma_s)$
$E_f$: The Young's modulus (MPa) of the resin
$\gamma_f$: The Poisson's ratio of the resin
$E_s$: The Young's modulus (MPa) of the glass
$\gamma_s$: The Poisson's ratio of the glass
$\delta$: $t_f/t_s$
$t_f$: The thickness (μm) of the glass
$t_s$: The thickness (μm) of the resin layer
R: The radius of curvature (μm)

(4) Modulus of Elasticity

A slot-shaped resin sample measuring 50 μm thick by 20 mm wide by 150 mm long was produced, and then the modulus of elasticity of the slot-shaped resin sample was measured with an AUTOGRAPH (AG-I manufactured by Shimadzu Corporation) from its elongation in its lengthwise direction and a stress. Test conditions were as described below. A chuck-to-chuck distance was set to 10 cm, and a tension speed was set to 10 mm/min.

(5) Fracture Toughness Value

A slot-shaped resin sample measuring 50 μm thick by 20 mm wide by 150 mm long was produced, and a crack (5 mm) was produced at an end portion on the longitudinal side (central portion) of the slot. A tensile stress was applied with an AUTOGRAPH (AG-I manufactured by Shimadzu Corporation) in the lengthwise direction of the slot, and then a stress at the time of the rupture of the resin from the crack was measured. Test conditions were as described below. A chuck-to-chuck distance was set to 10 cm, and a tension speed was set to 10 mm/min. A fracture toughness value $K_{IC}$ at the time of the rupture was determined by substituting the resultant tensile stress σ at the time of the rupture, a crack length a, and a sample width b into the following equation ("Fracture Studies on Ceramics" published by UCHIDA ROKAKUHO PUBLISHING CO., LTD., written by Akira Okada, P. 68 to 70).

$$K_{IC} = \sigma(\pi a)^{1/2} F(a/b)$$

$$F(a/b) = 1.12 - 0.231(a/b) + 10.55(a/b)^2 - 21.72(a/b)^3 + 30.39(a/b)^4$$ [Eq. 2]

TABLE 1

| | Characteristics of resin layer | | | | Characteristics of transparent substrate | | |
| --- | --- | --- | --- | --- | --- | --- | --- |
| | Radius of curvature (cm) | Shrinkage stress (MPa) | Modulus of elasticity (GPa) | Fracture toughness value (MPa·m$^{1/2}$) | Total thickness (d2) of thicknesses of resin layers/ thickness (d1) of thin-plate glass | Rupture diameter (mm) | Coefficient of linear expansion (ppm/°C.) |
| Example 1 | 15 | 21 | 2.3 | 4.1 | 1.52 | 28 | 8 |
| Example 2 | 16 | 20 | 1.8 | 3.2 | 1.4 | 23 | 9 |
| Example 3 | 14 | 23 | 2.3 | 4.1 | 1.4 | 25 | 10 |
| Example 4 | 45 | 7 | 1.8 | 3.2 | 1.4 | 32 | — |
| Example 5 | 32 | 9 | 2.0 | 2.3 | 1.48 | 32 | — |
| Comparative Example 1 | 180 | 2 | 1.8 | 3.2 | 1.4 | 37 | — |
| Comparative Example 2 | 180 | 2 | 2.3 | 4.1 | 1.4 | 37 | 9 |
| Comparative Example 3 | 90 | 4 | 2.1 | 1.3 | 1.4 | 40 | 10 |

As is apparent from Table 1, according to the present invention, a transparent substrate having a small rupture diameter, that is, excellent in bending property because of the presence of a resin layer having a specific shrinkage stress can be obtained.

INDUSTRIAL APPLICABILITY

The transparent substrate of the present invention may be used in a display device, a solar cell, or a lighting device. Examples of the display device include a liquid crystal display, a plasma display, an organic EL display, and electronic paper. The lighting device is, for example, an organic EL device.

REFERENCE SIGNS LIST 10 thin-plate glass
11, 11' resin layer
12, 12' coupling agent layer
13, 13' adhesion layer
100a, 100b, 100c, 100d transparent substrate

The invention claimed is:
1. A transparent substrate, comprising:
a thin-plate glass having a thickness of 10 μm to 100 μm; and
a resin layer on at least one side of the thin-plate glass, wherein the resin layer comprises a thermoplastic resin, wherein a shrinkage stress of the resin layer on the thin-plate glass is 5 MPa to 25 MPa, and
wherein the resin layer has a thickness of 5 μm to 80 μm.

2. The transparent substrate according to claim 1, wherein a ratio (d2/d1) between the thickness (d1) of the thin-plate glass and a total thickness (d2) of the resin layer is 0.3 to 4.

3. The transparent substrate according to claim 1 or 2, wherein the resin layer has a modulus of elasticity at 25° C. of 1.0 GPa or more.

4. The transparent substrate according to claim 1, wherein the resin layer has a fracture toughness value at 25° C. of 1.5 MPa·m1/2 or more.

5. The transparent substrate according to claim 1, wherein the resin has a glass transition temperature of 150° C. to 350° C.

6. The transparent substrate according to claim 1, wherein the resin layer is obtained by
    applying a solution comprising the thermoplastic resin to a surface on at least one side of the thin-plate glass to form an applied layer and
    drying the applied layer.

7. The transparent substrate according to claim 1, wherein the thin-plate glass and the resin layer are placed through an adhesion layer.

8. The transparent substrate according to claim 7, wherein the resin layer is obtained by
    attaching a thermoplastic resin film to a surface on at least one side of the thin-plate glass through the adhesion layer to form a laminate and
    subjecting the laminate to a heating treatment.

9. The transparent substrate according to claim 1, further comprising a hard coat layer having a pencil hardness of H or more on a side of the resin layer opposite to the thin-plate glass.

10. The transparent substrate according to claim 1, wherein the transparent substrate is used as a substrate for a display device.

11. The transparent substrate according to claim 1, wherein the transparent substrate is used as a substrate for a solar cell.

12. The transparent substrate according to claim 1, wherein the transparent substrate is used as a substrate for a lighting device.

13. A display device, comprising the transparent substrate according to claim 1.

14. A solar cell, comprising the transparent substrate according to claim 1.

15. A lighting device, comprising the transparent substrate according to claim 1.

* * * * *